G. A. SHIELDS.
MACHINE FOR ROLLING SHEET GLASS.
APPLICATION FILED MAY 28, 1913.
1,133,751.  Patented Mar. 30, 1915.
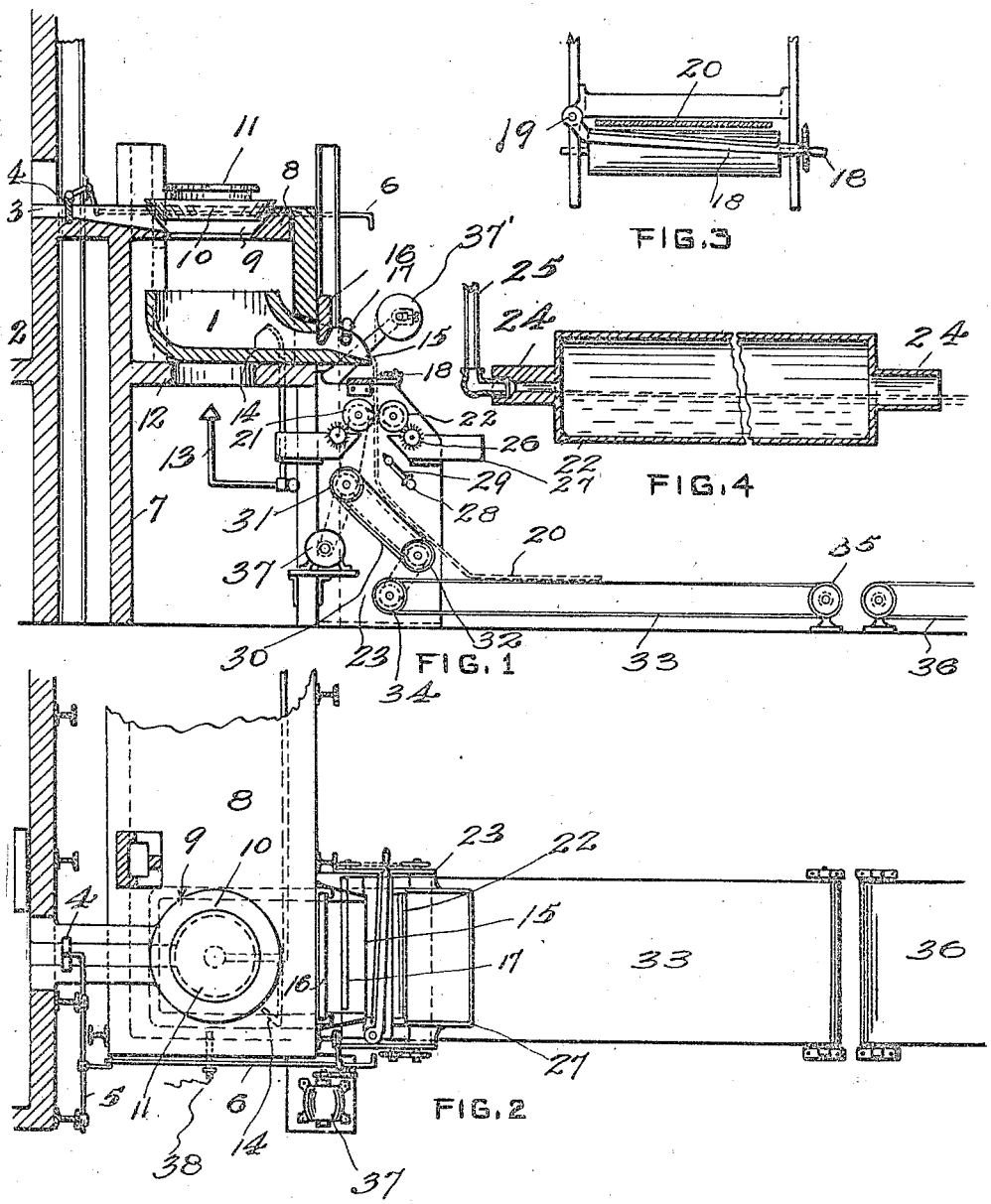
WITNESSES:
C. M. Shigley
H. A. Phillips
INVENTOR.
GEORGE A. SHIELDS
BY
Thomas Harris
ATTORNEY.

UNITED STATES PATENT OFFICE.

GEORGE A. SHIELDS, OF COLUMBUS, OHIO.

MACHINE FOR ROLLING SHEET-GLASS.

1,133,751.     Specification of Letters Patent.     Patented Mar. 30, 1915.

Application filed May 28, 1913. Serial No. 770,385.

*To all whom it may concern:*

Be it known that I, GEORGE A. SHIELDS, a citizen of the United States, residing at Columbus, in the county of Franklin and State of Ohio, have invented certain new and useful Improvements in Machines for Rolling Sheet-Glass, of which the following is a specification.

The present invention relates to machines for rolling sheet glass.

The primary object of the invention is the simplification of machines now in use for this purpose, and to provide means by which the molten or plastic glass may be converted into sheets and moved by gravity, thus eliminating waste to a considerable extent, avoiding the danger of breaking or buckling of the glass sheets in the process of manufacture, and facilitating the operation.

The invention consists essentially in certain novel combinations and arrangements of parts as will be hereinafter more clearly set forth and pointed out in the appended claim.

In the accompanying drawings I have illustrated one complete embodiment of the physical exemplification of the invention, constructed according to the best mode I have so far devised for the practical application of the principles thereof.

Figure 1 is a side elevation of the machine, showing a portion of a glass tank, and a glass pot associated therewith. Fig. 2 is a top plan view of Fig. 1. Fig. 3 is an enlarged detail of the cutting knife. Fig. 4 is a sectional detail of one of the hollow rollers.

In the preferred embodiment of my invention as illustrated, it will be noted that the parts are compactly arranged so that the molten glass may be kept at desired temperature. Thus the figure shows the glass pot 1 located in close proximity to the glass tank 2 of the usual furnace. The plastic glass or molten mass may be conveyed to the glass pot through a trough or channel 3, and the flow of the glass is controlled by gate 4 which may be lifted through the rocker arm 5 by means of the lever 6 which extends toward the front of the machine, and is located at a point convenient to an attendant. The glass pot is supported in a frame 7 composed of fire brick or clay, or other suitable refractory material, and the upper portion or top 8 is provided with an open seat 9 to receive the top or lid 10. In Fig. 2 it will be observed that the top 8 is broken away, to indicate that additional glass pots may be employed, but inasmuch as the parts would be duplicated, it is thought not necessary to illustrate them here. The lid 10 is provided with a top plate forming a flange 11 by means of which it may be lifted when the proper tools or tongs are applied thereto.

The glass pot rests upon an open bottom 12 beneath which is located a gas or oil burner 13, and a second burner 14 is pointed toward the side of the pot, the two burners serving to reheat or maintain the heat.

The glass pot is formed with a wide, flat, nozzle or spout 15, and across the nozzle is extended an adjustable gate 16 by means of which the quantity of plastic glass emerging from the pot may be regulated and its approximate thickness determined. In front of the gate 16 a gas burner 17 is located and is adapted to impinge and radiate heat upon the flowing glass to prevent its "freezing" as it passes over the edge of the spout. The molten glass flows over the edge of the spout in a uniformly thick film or sheet, predetermined approximately by the gate 16. Below the edge of the spout a cutting device or knife 18 is located, and in Fig. 3 it will be seen that this knife is pivoted to a side frame at 19 in close proximity to the glass sheet 20.

Below the spout and in close compact arrangement are located the rolling means for the glass sheet. These rolling means include a pair of hollow rollers 21, 22 supported in a frame 23, and formed with hollow trunnions 24, through which water may be passed from the supply pipe 25. The water level is indicated in Fig. 4, and the movement of the water is continuous for the purpose of cooling the rollers. Sometimes opacity of the glass is caused as the sheet passes between two such metallic rolls as 21, 22, and to avoid this possibility, I provide each roller with a long brush 26 that rotates in a reservoir 27 and contacts with its roller to apply a coat of paint or other liquid to the surface of the rollers as the paint is picked up by the rotating brush. This coat which prevents opacity of the glass may be washed off the glass afterward and has no deleterious effect thereon.

The course of the sheet 20 is indicated in dotted lines in Fig. 1, and after it has passed between the compression rollers which give it the desired accurate thickness and smooth out any irregularities that may occur, it is subjected to a suitable air blast from pipe 28 through nozzles 29 which serve to reduce the temperature of the glass. It will be understood that the glass is at a red heat throughout its length in dotted lines in Fig. 1, and the end of the sheet first passes over an inclined support 30 which is an endless belt or apron of asbestos passing around the rollers 31, 32, and in position to receive the sheet from the rollers 21, 22. A horizontally disposed conveyer belt 33 passing over the rollers 34, 35, and made of similar refractory material receives the sheet of glass from the inclined support, and a second horizontal conveyer is indicated at 36 to be used as required. The movable tables or belts are operated from a motor 37 by chains or belts as indicated in dotted lines.

The drum 37' located above the spout is adapted to hold a spool of wire or wire netting which is drawn or fed into the soft plastic glass as it passes over the edge of the spout, and it is firmly embedded in the sheet by the compression rollers, to form the commercial reinforced wire glass.

By means of a pyrometer indicated at 38, the desired and required intensity of heat can be accurately determined for the glass which is fed from the tank 2, and this heat may be maintained by means of the burners 13 and 14. After the required temperature has been ascertained by experiment, a continuation of this condition, to produce best results, will be simplified, and these heaters refine and anneal the molten glass without the use of additional means.

In operation it will be understood that the glass pot is filled from the tank 2 and the gate 4 closed. The molten glass is permitted to flow over the edge of the spout in a sheet or film, which sheet or film is compressed between the rollers, and then, after being severed, is conveyed by the aprons 30, 33, 36, to the proper finishing machines and devices.

Having thus fully described my invention, what I claim as new and desire to secure by Letters Patent is:—

The combination with a receptacle having a broad spout, of means for regulating the thickness of the glass sheet flowing therefrom, means for severing a length from the sheet, means for compressing the severed length of glass, an inclined conveyer below the compressing means, and means located below the compressing means for cooling the length of glass before it passes to the conveyer.

In testimony whereof I affix my signature in presence of two witnesses.

GEORGE A. SHIELDS.

Witnesses:
  C. M. SHIGLEY,
  F. McGLICK.